United States Patent
Fergason

[11] 3,918,796
[45] Nov. 11, 1975

[54] LIQUID-CRYSTAL NON-LINEAR LIGHT MODULATORS USING ELECTRIC AND MAGNETIC FIELDS

[75] Inventor: James L. Fergason, Kent, Ohio

[73] Assignee: Hoffmann-La Roche Inc., Nutley, N.J.

[22] Filed: Jan. 24, 1973

[21] Appl. No.: 326,565

Related U.S. Application Data

[62] Division of Ser. No. 113,948, Feb. 9, 1971, abandoned.

[52] U.S. Cl............................. 350/160 LC; 350/150
[51] Int. Cl.$^2$............................................... G02F 1/13
[58] Field of Search...................... 350/150, 160 LC

[56] References Cited
UNITED STATES PATENTS

| | | | |
|---|---|---|---|
| 2,524,286 | 10/1950 | Dreyer | 350/155 |
| 3,592,526 | 7/1971 | Dreyer | 350/159 |
| 3,597,044 | 8/1971 | Castellano | 350/160 LC |

OTHER PUBLICATIONS

Fergason et al: "Liquid Crystals and their Applications," *Electro–Technology*, Jan. 1970, pp. 41–50.

*Primary Examiner*—Edward S. Bauer
*Attorney, Agent, or Firm*—Samuel L. Welt; Bernard S. Leon; Mark L. Hopkins

[57] ABSTRACT

A liquid-crystal unit comprising first and second pieces of flat glass, each coated on one side with a transparent electroconductive oxide coating and each having its so-coated surface rubbed with cotton cloth or the like in one direction, with the two surfaces so rubbed then being spaced about ¼ to 2 mils apart and with a nematic-phase liquid-crystal material of positive dielectric anisotropy in between, and with the directions of rubbing being oriented substantially perpendicular to each other. Such a liquid-crystal unit has the particular property that when there is no potential applied to the electro-conductive coatings and the unit is placed between crossed polarizers, light is transmitted, but the application of but a relatively low voltage across the two above-mentioned coatings, something on the order of 5 volts, will generate an electric field that causes the nematic-phase liquid-crystal material to "untwist," so that it no longer permits transmission of light through the structure comprising the liquid-crystal unit and the crossed polarizers. The effect is quick-acting and reversible. Conversely, with parallel polarizers stationed to each side of such a unit, the effect is the opposite; with no voltage applied, no light is transmitted through the structure, but the application of sufficient voltage makes light transmission possible. The effect is sufficiently clear-cut and local that it is possible to use glass plates that have the electroconductive oxide coating provided only in certain selected areas thereof, with suitable bus bars or the like running to each, and thereby produce alpha-numeric displays. Logic elements, three-dimensional television, and numerous other applications suggest themselves to those skilled in the art.

42 Claims, 3 Drawing Figures

Electroconductive Transparent Coating

Nematic-Phase Liquid-Crystal Material with Positive Dielectric Anisotropy 3,918,796

LIQUID-CRYSTAL NON-LINEAR LIGHT MODULATORS USING ELECTRIC AND MAGNETIC FIELDS

CROSS-REFERENCE TO RELATED APPLICATION

This application is a division of copending application Ser. No. 113,948 filed Feb. 9, 1971, now abandoned

BACKGROUND OF THE INVENTION

1. Field of the Invention

This invention relates to a liquid-crystal unit that comprises a pair of glass plates, provided with a transparent electroconductive coating of tin oxide or the like and suitably prepared and assembled, with a liquid-crystal composition of positive dielectric anisotropy and nematic at room temperature therebetween. In another aspect, the invention relates to structures for the intermittent transmission of light, comprising a liquid-crystal unit of the kind above mentioned and a pair of polarizers. In yet another aspect, the nematic-phase liquid-crystal compositions of the invention are sandwiched between glass plates that lack the above-mentioned coatings of transparent electroconductive material, but means are provided for generating a magnetic field of sufficient force to cause the nematic-phase material to "untwist," with the same result as is obtained with the application of an electric field of sufficient magnitude. In yet another aspect, the invention concerns the use of liquid-crystal units or structures of the general kind indicated above, with the electroconductive coating being limited to specific areas and provided with particular, desired potential supply means, so as to generate a desired alpha-numeric display.

2. Description of the Prior Art

There are known quite a large number of organic chemical compounds that will, within a particular temperature range, exhibit nematic-phase liquid crystals. These compounds are liquid in the sense that their molecules are neither so dissociated as in a gas nor so tightly bound within a structure as in a solid, but at the same time they are said to be crystalline, in that there is a particular ordering to the orientation of molecules, as is sometimes evidenced by peculiar optical effects. Organic materials exhibit under certain conditions what are sometimes called a mesomorphic phase, and there are different families of organic-chemical compounds that exhibit mesomorphic phases of different kinds—the cholesteric, the smectic, and the nematic. These are each characterized by a particular kind of molecular orientation. Most of the known nematic-phase liquid-crystal materials are listed by W. Kast in Landolt and Börnstein, Vol. II, Part 2a, 6th Ed., Springer, Berlin (1960), pp. 266–335. The known materials are not, in the main, suitable for widespread use, since they are nematic only at above about 20° Centigrade or within a temperature range somewhat too narrow to suit them for such use.

It is known that when a nematic-phase liquid-crystal material is stationed between pieces of glass that have been rubbed, each of them unidirectionally and on the surface in contact with the nematic-phase liquid-crystal material, there is thus obtained a liquid-crystal unit whose optic axis lies in the direction of unidirectional rubbing.

The techniques for placing onto flat glass a transparent electroconductive coating of tin oxide or indium oxide or the like are quite familiar to persons skilled in the art of making flat glass. Reference may be made to the patents of Tarnapol (U.S. Pat. No. 2,694,761) or Saunders (U.S. Pat. No. 2,648,752). It is appreciated that if the pieces of glass are to be of relatively large surface extent and evenly spaced substantially throughout same, it is necessary to avoid the development of any appreciable warpage in the flat glass while the transparent electroconductive coating is developed thereon. Under the technology of about 5 years ago this presented a considerable problem, since the transparent electroconductive coatings then known were nearly always developed by spraying a tin-containing solution onto glass that was quite hot (about 1000°F.), such that the glass was at about the point of warping. However, there has recently been made commercially available by a major flat-glass producer a kind of flat glass that is understood to have been produced by vacuum cathode-sputtering onto the glass, while it remains at quite a lower temperature, a composition that is principally indium oxide.

It may be taken as known that there are numerous ways of arranging patterns of luminous, transparent, or opaque material so as to constitute, with suitable selective activation, an alphanumeric display. It may be taken as known how to supply electrical potential to, and thus activate, patches of electroconductive transparent oxide coating situated on pieces of flat glass.

SUMMARY OF THE INVENTION

It has been discovered that there exists a family of materials that exhibit nematic phase at room temperature and at the same time a positive dielectric anisotropy. Moreover, they have these properties over a substantial temperature range.

It has been discovered, moreover, that it is possible to change the known light-rotating action of nematic-phase liquid-crystal materials by the action of a suitable electrical or magnetic field, and that the threshold value for such change occurs at conveniently low applied voltage, such as 5 volts, and that the liquid-crystal material responds rapidly and locally to such change.

It has been found that, in view of modern technology concerning the production of pieces of flat glass having thereon electroconductive coatings that are transparent, one may utilize the two above-mentioned discoveries for the production of selective devices for the intermittent transmission of light, as in, for example, alphanumeric displays and logic devices.

DESCRIPTION OF THE DRAWINGS

A complete understanding of the invention may be obtained from the foregoing and following description thereof, taken in conjunction with the appended drawings, in which.

DESCRIPTION OF THE PREFERRED EMBODIMENTS

Figure 1:
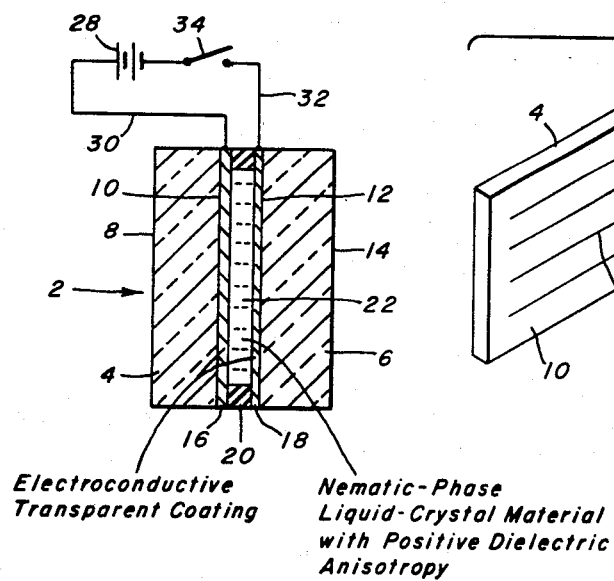
FIG. 1 is a schematic view, in section and not to scale, of a liquid-crystal unit made in accordance with the present invention.

In the practice of the instant invention, it is considered highly desirable to use a nematic-phase liquid-crystal composition that has a considerable temperature range within which it exhibits the nematic phase, such as minus 10°C. to plus 70°C., at the same time having a positive dielectric anisotropy. The importance of the latter factor is not to be overlooked. A negative dielectric anisotropy implies that with the application of a field, the molecules tend to line up parallel to the major surfaces of the pieces of flat glass between which the liquid-crystal material is contained, rather than perpendicular thereto, as is intended and required in accordance with the concept of the instant invention, which may be considered as involving the phenomenon of causing a relaxation of the twist of a twisted nematic-phase material by the application of such field. A substantial number of the known nematic-phase liquid-crystal materials have negative dielectric anisotropy.

The problem of finding a suitable mixture of organic chemicals so as to obtain a composition of matter that exhibits at, for example, minus 10° Centigrade to plus 70° Centigrade, the needed combination of nematic phase and positive dielectric anisotropy may be solved by compounding the following mixture: 40 parts by weight of bis-(4'-n-octyloxybenzal)-2-chlorophenylenediamine, 50 parts by weight of p-methylbenzal-p'-n-butylaniline, and 10 parts by weight of p-cyanobenzal-p'-n-butylaniline. In the mixture abovementioned, it is considered that the last-named compound is the one that imparts the essential positive dielectric anisotropy; the use of it in greater amounts may be expected to lower the value of the threshold voltage that is required to obtain the needed effect. There is an equation that may be used to express the threshold voltage, namely:

$$v = \pi \sqrt{k/\Delta\epsilon}$$

where $v$ equals the threshold voltage in volts,
$\pi$ equals 3.1416,
$k$ is an elastic constant having units of dynes,
and
$\Delta\epsilon$ is a difference in electrical polarizability for the material involved, parallel versus perpendicular to the long axis of the molecules, expressed in c.g.s. units.

For the mixture indicated above, perhaps the principal active ingredient is the p-cyanobenzal-p'-n-butylaniline. Its structural formula is:

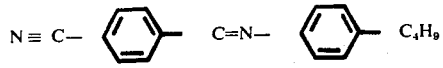

It may be made by refluxing p-cyanobenzaldehyde for about 6 hours with p-n-butylaniline, using methanol as solvent. The preparation is routine for those skilled in making Schiff bases. After recrystallization from methanol, the desired compound is obtained in a yield of 80 to 85 percent.

The possibility of using analogues or homologs of the particular compound discussed above in place of it is not to be ruled out, but at this time the propylaniline is not readily available, and the corresponding compounds made with methylaniline or ethylaniline are somewhat less soluble and therefore less desirable. It is considered that the effects desired may be obtained with the use of a compound of the formula:

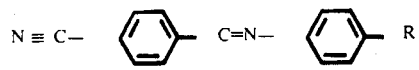

where $R$ is a saturated aliphatic alkyl radical having 1 to 12 carbon atoms. The para relationship between the radical $R$ and the remainder of the molecule is considered essential.

In the particular mixture mentioned above, the bis-(4'-n-octyloxybenzal)-2-chlorophenylenediamine is a low-melting solid, and the p-methylbenzal-p'-n-butylaniline is a liquid at room temperature. Those skilled in the art may perceive equivalents for these compounds. It is apparent that the proportions in which they are mixed may be adjusted suitably to influence the operating temperature range of the mixture—using more of the former will give mixture that operates (has nematic phase and positive dielectric anisotropy) at a lower temperature, while using more of the latter has the opposite effect. It may be gathered from the above discussion that the two compounds discussed in this paragraph comprise the major part of the mixture, with the cyanobenzalbutylaniline comprising only a minor portion thereof. Indeed, as little as 3 parts by weight in 100 of the cyanobenzalbutylaniline appears to be a proportion effective to yield the desired positive dielectric anisotropy while being compatible with the remainder of the mixture. On the other hand, it is desirable to use greater proportions of the cyanobenzalbutylaniline, since this lowers the threshold value, but there is probably not in most cases any particular advantage in the use of more than about 40 parts by weight in 100.

Though there has been described above one suitable mixture, there are doubtless others that will be found useful and it is within the spirit and scope of the invention to use them, as hereinafter described and indicated.

In FIG. 1 of the appended drawings, there is shown a liquid-crystal unit 2 that comprises a first piece of flat glass 4 and a second piece of flat glass 6. The drawing is not to scale, and it constitutes a cross-sectional view. The major surfaces of the piece 4 are indicated at 8 and 10 and those of piece 6 at 12 and 14.

Preferably, but not absolutely necessary, there are provided upon the major surfaces 10 and 12 the coatings 16 and 18, respectively. Coatings 16 and 18 are thin, transparent, electroconductive coatings, such as the known tin-oxide or indium-oxide coatings. It should be noted that these coatings may, for the purposes of the instant invention, be quite thin and highly resistive, for example, on the order of 150 ohms per unit square or above, and possibly as high as 5,000 or 10,000 ohms per unit square. This contrasts with requirements for lower resistivity in flat-glass provided with transparent electroconductive coatings for such purposes as heated aircraft windows. If the pieces of flat glass are to be relatively large and uniformly spaced from each other, it is desirable that the transparent electroconductive coating be of the kind that is applied at relatively low temperature such as about 500° Fahrenheit by a process of cathode-sputtering in vacuum, so that dangers of warpage may be safely avoided.

Completing the structure of unit 2 are the spacers 20 and a layer 22 of nematic-phase liquid-crystal material with positive dielectric anisotropy. The spacers may be made of any suitable material, such as oil-resistant double-sided adhesive tape, and have such dimensions as to separate the surfaces 10 and 12 by approximately ¼ to 2 mils. The rapidity of the response of the liquid-crystal unit is influenced by the amount of separation between the surfaces 10 and 12. For a response time on the order of milliseconds, the separation should be small, such as ¼ mil, whereas if a longer response time is tolerable, the separation may be correspondingly greater, being possibly as great as about 5 mils. The spacing may in some instances be as little as 0.1 or 0.05 mil.

The nematic-phase liquid-crystal material comprising the layer 22 is preferably of the kind hereinabove indicated, namely, one comprising major portions such as 20 to 80 weight percent each of bis-(4'n-octyloxybenzal)-2-chlorophenylenediamine and p-methylbenzal-p'-butylaniline, these making up about 60 to 97 weight percent of the total composition and the p-cyanobenzal-p'-p-butylaniline comprising the remaining 3 to 40 weight percent. The use of substitutes in the same or different proportions is not being ruled out, but for the most part, it is difficult to find a material that exhibits the combination of properties principally desired, namely, positive dielectric anisotropy and a board operating-temperature range that includes room temperature.

Figure 2:
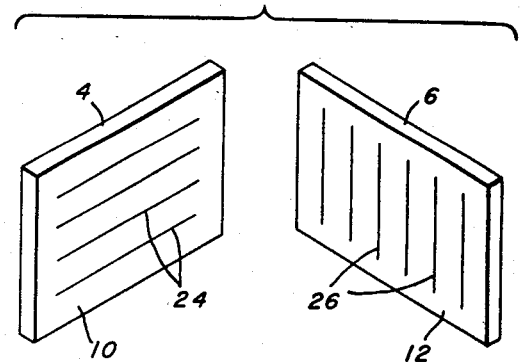
FIG. 2 is a view illustrating a certain feature in the mode of preparation of the glass pieces used in a liquid-crystal unit according to the invention.

In FIG. 2, there is a view of the pieces 4 and 6 of flat glass (not to scale, the glass being about one-eighth inch thick). The lines 24 on the surface 10 indicate a direction of rubbing. The lines 26 on the surface 12 have the same significance. In the preparation of a liquid-crystal unit 2, the surfaces 10 and 12 that are to be in contact with the nematic-phase liquid-crystal material 22 are prepared by being stroked or rubbed unidirectionally with, for example, a cotton cloth. Those skilled in the art of dealing with nematic-phase, liquid-crystal materials have long known that such material tends to align with a surface that has been stroked or rubbed unidirectionally. The practice for making the liquid-crystal unit 2 comprises rubbing the surfaces 10 and 12 as indicated, applying the material 22 to one of the surfaces, and then bringing the surfaces 10 and 12 together. As will be observed from FIG. 2, the direction of rubbing on the surfaces 10 is oriented at about 90° with respect to the rubbing on the surface 12. The effect is that there is obtained a twisted nematic structure.

The molecules in a nematic-phase liquid crystal material are each long and straight, and they tend to lie parallel, like logs in a river or straws in a broom. Their parallelism is statistical, rather than perfect and exact; they are free to move with respect to one another, and there are some that are at some or another small acute angle with respect to the "main stream," and a few others that are at any given moment in a position even less consonant with the bulk of the others. A property of the nematic-phase materials is that the molecules in the vicinity of a rubbed surface tend to align themselves with it. The molecules nearest the surface 10 are thus inclined to orient themselves parallel with the lines 24, and those nearest the surface 12 are inclined to orient themselves parallel to the lines 26. The structure is fluid and active; the molecules in between, in the various layers that are parallel to the surfaces 10 and 12, under conditions of no applied voltage, then arrange themselves in what may be considered a number of layers of suitable intermediate "main-stream"direction, ranging from one close to parallel to the lines 24 (a short distance from the surface 10) through one at about a 45° angle with respect to both the lines 24 and the lines 26 (at about the midpoint of the distance between the surfaces 10 and 12) and on to one close parallel with lines 26 (a short distance from surface 12). The effect of the liquid-crystal unit 2 upon polarized light that impinges upon its surface 8 and is polarized parallel to the lines 24 is that the unit effects a rotation of the plane of polarization of the light as it passes through the unit, so that the light emanating from the surface 14 is plane-polarized parallel to the lines 26. It would not matter if the plane-polarized light impinging upon the surface 8 were polarized in parallel planes that were at some angle with respect to the lines 24; the same effect of rotation of the plane of polarization is obtained. The extent of rotation does not need to be 90°; any desired extent of rotation may be obtained, merely by orienting and corresponding properly the unidirectionally rubbed surfaces 10 and 12.

To obtain a proper understanding of the invention, it is necessary to understand that the action of an electric field may change the above-described orientation of the molecules. It is possible to classify the nematic-phase materials according to their dielectric anisotropy. Anisotropy means (in one sense) a tendency to assume a directionality and (in another sense) the property of having adopted such directionality. Theoretically, a material may have a dielectric anisotropy of zero, which means that an electric field has no influence upon the orientation of the molecules, either to make them perpendicular to it (negative) or parallel to it (positive). The particular materials with which the instant invention is practiced exhibit a positive dielectric anisotropy, which means that it is possible by the application of an electric field of sufficient strength to cause the molecules to foresake their previous orientation and align themselves parallel to the direction of the electric field. The usual elementary physics example of an electric field is that existing between the plates of a condenser, and the situation within the unit 2 of the instant invention is analogous, with the layers 16 and 18 acting like the plates of the condenser. When there is applied to the layers 16 and 18 a suitable d-c potential, the alignment of the molecules in the material 22 becomes parallel to the electric field, i.e., perpendicular to the surfaces 10 and 12. When plane-polarized light impinges upon the surface 8, there is now no rotatory effect; the light emanating from th surface 14 remains polarized in the same plane.

What is surprising about the phenomena explained above is that the effect is so rapid, so local, so reversible, and so obtainable with even quite a modest impressed voltage, such as about 5 volts and possibly less.

Those skilled in the art will understand that in the construction of the unit 2 it is necessary to provide a way to impress the voltage across the layers 16 and 18. These means are indicated schematically in FIG. 1 as comprising a battery 28 and lead lines 30 and 32, with the line 32 preferably containing a switch 34. Of course, the desired electric field may conceivably be produced in other ways that do not require the use of the layers 16 and 18 of transparent, electroconductive material, but the use of some selectively actuable means for the generation of the required field is essential to the practice of the invention.

The required field need not necessarily be an electric one, at least in terms of the means used to produce it. With the use of a magnetic field of sufficient strength and suitable location and orientation, it is possible to obtain the same effect.

In the embodiments contemplated in the previous paragraph, the magnetic field is applied substantially similar to the layer 22 of nematic-phase liquid-crystal material. An alternative, of course, is to use a nematic-phase, liquid-crystal which has positive diamagnetic anisotropy. Most namatic-phase liquid-crystal materials exhibit negative diamagnetic anisotropy. When a liquid-crystal material of positive diamagnetic anisotropy is used, the effect of the magnetic field may be reinforced by the application of an electric field.

Figure 3:
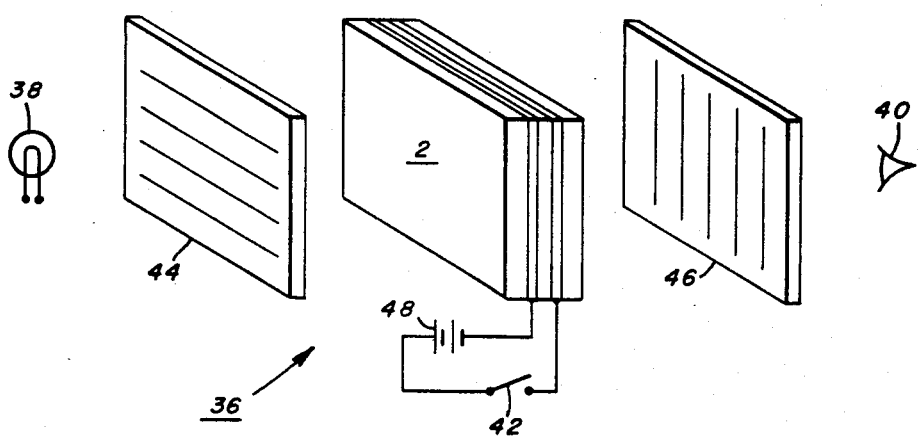
FIG. 3 is a perspective view, partly schematic, of a structure for the selective transmission of light, made in accordance with the present invention.

Bearing in mind the foregoing, there will be explained below with reference to FIG. 3 how, by means of a structure 36 the light emanating from a source 38 may be allowed to reach or prevented from reaching an eye 40 or other light-sensitive device, all in accordance with the manipulation of a switch 42. The structure 36 comprises a liquid-crystal unit 2, sandwiched between crossed polarizers 44 and 46. The switch 42 corresponds to the switch 34 of FIG. 1, and the battery 48 corresponds to the battery 28. With the light source 38 operating constantly, light passes through the polarizer 44 and becomes plane-polarized. With no applied voltage, the unit 2 rotates the plane of polarization of the light passing therethrough through 90°, so that the light is now plane-polarized in such a manner as to be passed by the polarizer 46. Thus, the light is received by the eye 40.

When the switch 42 is closed, there is a change within the unit 2 as above described, such that its effect of rotating the plane of polarization disappears, and the light passes straight through the unit 2, coming against the polarizer 46, whose plane to polarization is crosswise of that of the light impinging upon it—hence, no transmission. The effect is rapid, requiring at most a few seconds and possibly something on the order of milliseconds. It is local; those skilled in the art will readily appreciate how suitable alphanumeric displays may be generated, merely by using suitably shaped and located and powered segments of electroconductive coating in place of the above-described layers 16 and 18.

In the foregoing description, the polarizers 44 and 46 are crossed, but it will be apparent to those skilled in the art what would happen if they were parallel. The structure would then operate in just the reverse manner: with no applied voltage, no transmission and with applied voltage, transmission.

Devices more complex can be made. For example, with three polarizers and two units, one can make an AND gate. If the polarizers are all parallel and the parts are arranged polarizer-unit-polarizer-unit-polarizer, the failure to activate one or both of the units by applying voltage will cause the gate to fail to transmit.

As another example, one can make an exclusive NOR gate, using two parallel polarizers and first and second units between them. This gate will not transmit if one unit or the other is activated, but it will if both or neither is activated.

The design of other and more complicated kinds of logic devices involving larger numbers of units in logical-zero or logical-one condition, is also possible.

Numerous other potential applications of the instant invention suggest themselves to those skilled in the art. Boolean-function generators may be made in this way. The devices may be used for shuttering. With a system sufficiently fast-acting, it is possible to generate three-dimensional television or movie images (though, as before, glasses polarized in different directions must be worn) by suitable rapid and repeated activation or deactivation of the electric field.

Although there has been disclosed hereinabove a practice of preparing the surfaces that are to come into contact with the liquid material by stroking or rubbing with a cotton cloth, it will be apparent to those skilled in the art that as the art develops, it is likely that various means more sophisticated and effective for preparing the surface involved will be developed. The technique of preparing the plates either by stroking or rubbing or by more sophisticated means to effect appropriate alignment of the liquid crystal molecules at the facing surfaces of the plates, is known as "wall orientation." Thus, wall orientation denotes a certain surface state exerting an orienting influence on the molecules adjacent to the plates, i.e. on the boundary layer of the liquid crystal, which causes the liquid crystal to define a twisted structure.

In the disclosure contained hereinabove, there is contemplated only the possibility that the polarizers used may be elements external to the liquid-crystal unit. It is possible, however, to incorporate the polarizers directly into the unit. This may be done by treating the surfaces of the conductive coating, after it has been rubbed, with a solution which forms a dichroic film of the kind described by Dryer in U.S. Pat. Nos. 2,544,659, 2,524,286 and 2,400,877. A suitable solution comprises a 4 weight percent aqueous solution of methylene blue.

Those skilled in the art of constructing multipoint visual displays will preceive that it is possible with the use of the instant invention to simplify considerably the problem of addressing a plurality of points. Instead of requiring 35 separate inputs for a five-by seven alphanumeric display, the same result can be accomplished with only 12 inputs, one for each row and one for each column.

I claim as my invention:

1. An optical device for continuous control of light transmission comprising:

electro-optical cell means including liquid crystal means having positive dielectric anisotropy disposed between two spaced plates, at least one of which plates is transparent and each plate being electrically conductive at a surface facing said liquid crystal means;

said plates being wall-oriented to cause said liquid crystal means to define a twisted structure in the direction perpendicular to the plates;

polarizing means disposed one before and one behind the liquid crystal means, in the direction of light traveling through the cell means; and electrical means connected to the plates for controlling the twisted structure of said liquid crystal means.

2. An optical device according to claim 1 wherein said liquid crystal means has a nematic phase which includes room temperature.

3. An optical device according to claim 1 wherein said liquid crystal means has a nematic phase in the temperature range of at least −10°C to 70°C.

4. An optical device according to claim 2 wherein said polarizing means comprises dichroic films.

5. An optical device according to claim 4 wherein the surfaces of the plates facing the liquid crystal means are covered with a film of a transparent conductive material and wherein said dichroic films are deposited on said films of conductive material and are in contact with said liquid crystal means.

6. An optical device according to claim 5 wherein both plates are transparent.

7. An optical device according to claim 2 wherein the plates have a transparent conductive material on each of said facing surfaces and said electrical means includes connecting leads in operative contact with the conductive material for applying a voltage to the plates, said electrical means being adapted to apply an electrical field across the liquid crystal means perpendicular to the plates.

8. An optical device according to claim 1 wherein said facing surfaces of the plates are unidirectionally rubbed in non-parallel directions relative to one another.

9. An optical device according to claim 8 wherein said surfaces of the plates are rubbed unidirectionally at right angles to each other.

10. An optical device according to claim 9 wherein the two polarizing means are oriented parallel to one another.

11. An electro-optical device according to claim 9 wherein said two polarizing means are crossed.

12. An optical device according to claim 9 wherein said plates are spaced 0.05 to 5 mils apart.

13. An optical device according to claim 2 wherein said liquid crystal means consists essentially of a nematic liquid crystal material.

14. An optical cell for continuously passing substantially all incident polarized light comprising:
two plates at least one of which plates is transparent;
a substance between the plates consisting of a mixture of nematic liquid crystals, said mixture having positive dielectric anisotropy;
said plates being wall oriented in non-parallel directions relative to one another for causing said mixture to define a twisted structure in a direction substantially perpendicular to the plates; and
electrical means for providing an electrical field across said liquid crystal mixture transverse to the plates for controlling the twisted structure of said mixture.

15. An optical cell according to claim 14 wherein said liquid crystal mixture is in its nematic phase at room temperature.

16. An optical cell according to claim 15 wherein said electrical means includes conductive means comprising a transparent conductive material on the facing surfaces of said plates and connecting leads for applying a voltage to the plates.

17. An optical cell according to claim 16 wherein the surfaces of the plates facing the liquid crystal mixture are each at least partially covered with said transparent conductive material and wherein the connecting leads are established for the purpose of applying voltage to the conductive material.

18. An optical cell according to claim 17 wherein both plates are transparent.

19. An optical cell according to claim 18 wherein the surfaces of the plates facing the liquid crystal mixture are rubbed to effect said wall orientation.

20. An optical cell according to claim 19 wherein the plate surfaces have a preferential direction.

21. An optical cell according to claim 18 wherein said surfaces of the plates are rubbed unidirectionally at right angles to each other.

22. An optical cell according to claim 15 wherein the wall orientation resides in a surface state of the plates exerting an orienting action on the molecules of the nematic liquid crystal mixture.

23. An optical cell according to claim 22 wherein said plates are spaced 0.05 to 5 mils apart.

24. A process for the control of light transmission comprising the steps of:
providing an electro-optical cell having nematic liquid crystal means of positive dielectric anisotropy disposed between a pair of spaced plates at least one of which is transparent and means for enabling an electrical field to be applied across the liquid crystal means, said plates being wall oriented at the surface thereof facing the liquid crystal means to cause said liquid crystal means to define a twisted structure in the direction perpendicular to the plates;
polarizing, with a first polarizing means, light entering the cell whereby the direction of polarization of polarized light transmitted through the liquid crystal means follows the orientation of the molecules of the liquid crystal means;
providing transverse to said plates the electric field across at least a portion of the liquid crystal means for changing the orientation of the liquid crystal molecules under the influence of the electrical field such that said molecules align in a direction substantially parallel to the direction of the electric field; and
analyzing with a second polarizing means light transmitted through the liquid crystal means.

25. A process according to claim 24 wherein said field is a DC field.

26. A process according to claim 24 wherein said field is an alternating field.

27. A process according to claim 24 including rubbing each of said facing surfaces to derive a surface state oriented in a non-parallel direction relative to one another.

28. A process according to claim 27 wherein the surface state of each facing surface is oriented in a direction which is perpendicular to the direction of orientation of the other, such that the plane of polarization of the light is rotated through 90°.

29. A process according to claim 24 wherein said liquid crystal means consists essentially of a nematic liquid crystal material.

30. A process according to claim 29 wherein said liquid crystal means is nematic at room temperature.

31. A method for controlling light transmission comprising:
providing an optical cell having a pair of spaced plates, at least one of which is transparent, nematic liquid crystal means of positive dielectric anisotropy disposed between said plates and means for enabling an electrical field to be applied across the liquid crystal means, the surfaces of the plates facing the liquid crystal means each having a surface state oriented in a non-parallel direction relative to one another, the surface state of the facing surfaces exerting an orienting influence on the molecules of the liquid crystal means such that the molecules define a structure which rotates the plane of polarization of substantially all of the light passing through the liquid crystal means in the absence of the electric field;

polarizing, with a first polarizing means, light entering the cell whereby the direction of polarization of polarized light passing through the liquid crystal means follows the orientation of the molecules of the liquid crystal means;

providing transverse to said plates the electric field across at least a portion of the liquid crystal means for changing the orientation of the liquid crystal molecules which are under the influence of the electrical field such that said molecules align in a direction substantially parallel to the direction of the electric field, and light passing through said portion follows the orientation of said influenced molecules; and analyzing with a second polarizing means light transmitted through the liquid crystal means.

32. A method according to claim 31 wherein the surface state of each facing surface is oriented in a direction which is perpendicular to the direction of orientation of the other, such that the plane of polarization of the light is rotated through 90°.

33. An optical device comprising:
   a. optical cell means comprising a pair of spaced plates, at least one of which is transparent and a substance disposed between said plates which passes substantially all light incident on the substance and which consists essentially of a nematic liquid crystal material of positive dielectric anisotropy, said substance having a molecular orientation defining a structure which optically rotates substantially all light passing through the substance, the surface of each plate facing the substance having a surface state oriented in a non-parallel direction relative to one another, for causing the molecules of the substance to become oriented into said structure;
   b. means in operative contact with the substance for electrically controlling the molecular orientation of at least a portion of the substance effective to terminate the optical rotation of the light passing through the electrically controlled portion of the substance;
   c. means proximate said at least one transparent plate for polarizing the light received by said transparent plate; and
   d. polarizing means proximate the other of said plates for analyzing the light passing through the substance.

34. An optical device according to claim 33 wherein the liquid crystal materials is in its nematic phase at room temperature.

35. An optical device according to claim 34 wherein said means for electrically controlling the molecular orientation of said portion of the substance includes conductive means comprising a transparent conductive material on the facing surfaces of said plates and connecting leads for applying a voltage to the plates.

36. An optical device according to claim 34 wherein said facing surfaces are unidirectionally rubbed in non-parallel directions relative to one another to provide said surface state.

37. An optical device according to claim 36 wherein said facing surface is rubbed in a direction which is perpendicular to the direction of rubbing of the other.

38. An optical device according to claim 33 wherein the liquid crystal material is nematic in the temperature range of at least −10°C to 70°C.

39. An optical device for controlling the transmission of light comprising:
   a. a substance consisting essentially of a nematic liquid crystal material having positive dielectric anisotropy,
   b. means confining said liquid crystal material whereby said confining means and said liquid crystal material form an optical cell which passes through the liquid crystal material substantially all light incident on the liquid crystal material,
   c. said liquid crystal material having a twisted molecular structure,
   d. said confining means being transparent on at least one side of said cell and being prepared at the surfaces facing the liquid crystal material to cause said liquid crystal material to define said twisted structure wherein the twist extends in a direction transverse to said at least one side of said cell,
   e. light polarizing means disposed in front of and behind the liquid crystal material in the path of light transmitted through the liquid crystal material, and
   f. means for applying an electrical field to said liquid crystal material to control its twisted structure.

40. An optical device according to claim 39 wherein said liquid crystal material has a nematic phase in the temperature range of at least −10°C to 70°C.

41. A device according to claim 40 wherein said means for applying an electrical field includes conductive material on said facing surfaces and means for applying a voltage to the conductive material and establishing said electrical field across at least a portion of said liquid crystal means whereby the molecules of the liquid crystal means under the influence of the electrical field align substantially parallel to the direction of the applied electrical field.

42. A method of controlling the transmission of light comprising the steps of:
   a. confining a nematic liquid crystal material having positive dielectric anisotropy between a pair of facing wall surfaces at least one of which walls is transparent,
   b. establishing a first condition of light transmission in the liquid crystal material by preparing said facing wall surfaces to provide a surface state oriented in non-parallel directions relative to one another for causing the liquid crystal material to assume a molecular orientation effective to rotate the plane of polarized light through a predetermined angle,
   c. introducing polarized light into the liquid crystal material through said at least one transparent wall and in said first condition rotating the plane of polarization of the light through said predetermined angle as it passes through the liquid crystal material,
   d. directing the rotated light to a polarizer having a plane of polarization in predetermined relationship with the plane of polarization of the light incident on the liquid crystal material,
   e. electrically establishing a second condition in at least a portion of the liquid crystal material such that the plane of polarization of light emitted therefrom is transverse to the plane of polarization of emitted light from the liquid crystal material in said first condition, and
   f. transmitting light from said polarizer when said portion of the liquid crystal material is in one of said conditions and substantially blocking the transmission of light by said polarizer when said portion of the liquid crystal material is in the other of said conditions.

* * * * *

Disclaimer 3,918,796.—*James L. Fergason*, Kent, Ohio, LIQUID-CRYSTAL NON-LINEAR LIGHT MODULATORS USING ELECTRIC AND MAGNETIC FIELDS. Patent dated Nov. 11, 1975. Disclaimer filed July 2, 1976, by the assignee, *Hoffmann-La Roche Inc.*

The term of this patent subsequent to May 8, 1990 has been disclaimed.

[*Official Gazette February 8, 1977.*]